OR 3,656,827
1 30361
X 3050 Y

United Sta
Gamblin et al.

[15] 3,656,827

[45] Apr. 18, 1972

[54] HOLOGRAPHIC READ/WRITE STORAGE SYSTEM

[72] Inventors: Rodger L. Gamblin, Vestal, N.Y.; Carl D. Southard, Raleigh, N.C.

[73] Assignee: International Business Machines, Armonk, N.Y.

[22] Filed: Apr. 3, 1969

[21] Appl. No.: 813,198

[52] U.S. Cl................................................350/3.5, 346/108
[51] Int. Cl.........................................................G02b 27/22
[58] Field of Search...................................350/3.5; 346/108

[56] References Cited

UNITED STATES PATENTS 3,364,497 1/1968 MacAdam........................350/3.5 UX

OTHER PUBLICATIONS

Paques et al., Gr. Acad. Sc. Paris, 260: 6562–6564 (6/1965).
McCrickerd et al., Applied Physics Letters Vol. 12, No. 1, pp. 10–12 (1/1968).

*Primary Examiner*—David Schonberg
*Assistant Examiner*—Robert L. Sherman
*Attorney*—Hanifin and Jancin and Andrew Taras

[57] ABSTRACT

The invention relates to a holographic mass data storage system in which coded representations of data are recorded on the photosensitive surface of a drum sequentially under control of mechanical means, and means for reading the written information, by reflection onto an array of radially disposed photodetectors. An address control means is provided whereby the written information may be selectively read out in any desired combinations of words of information.

2 Claims, 4 Drawing Figures

INVENTORS
RODGER L. GAMBLIN
CARL D. SOUTHARD

BY [signature]

AGENT

HOLOGRAPHIC READ/WRITE STORAGE SYSTEM

BACKGROUND OF THE INVENTION

The growing demands of the computer industry stemming from increasing sophistication in programming and the need for greater system versatility has prompted the need for a low cost high volume data storage system. As computers are applied to more general pattern recognition problems and as archival storage systems are realized, the need for inexpensive mass non-volatile storage will be increased.

Present storage media, for example, tapes, drums and discs, suffer from relatively slow access times and relatively high cost for the retrieval of the stored data. The unsuccessful attempts to design optical storage systems due to critical alignment of components and the sensitivity to dust has further prompted the exploration of holographic techniques for mass storage systems.

The advantages inherent in the use of holography, namely, insensitivity to dust and system misalignment, makes possible the realization of low-cost, high-density information storage system.

The storage capacity of a hologram can be of very high density compared to non-optical methods such as are currently used with magnetic disk, drum or tape, or other discrete storage devices such as magnetic film or cores. The storage capacity of a hologram as will be seen below is comparable to that achievable in principle with conventional optical storage systems. The latter, however, have not been realized due to technical difficulties associated with the storage of minute discrete bits in photographic film. In particular, dust and film imperfections in a conventional optical system introduce losses that materially degrade information content of the data stored.

Considering that the hologram is made on a photographic plate with a resolution of $n$ lines per millimeter, and that it behaves basically as a diffraction grating, the relation of the angle into which the hologram can diffract to the resolution ability of the film can be calculated by means of the following expression:

$$\sin \theta = \lambda n$$

Wherein $\theta$ is the angle into which the hologram can diffract, $\lambda$ is the wavelength of light used and $n$ the film resolution.

In considering a hologram of unit dimension, the approximate angular resolution capability of this hologram is given by the expression:

$$\delta \theta = \lambda$$

Wherein $\delta\theta$ is the resolution capability. The number of bits that can be fitted into the angle $\theta$ in one dimension is thus given by $(\theta/2(\delta\theta))$. Since, in general, the field of a hologram is two dimensional the capacity of a unit area of a hologram is given approximately by the expression:

$$(\theta/2(\delta\theta))^2 = n^2/4$$

Thus the storage capacity of a hologram is on the order of $5 \times 10^5$ bits per millimeter squared. This number is approximately the same as could, in principle, be realized from a conventional optical system and is much greater than other present alternatives.

It is a characteristic of a hologram that the information associated with each bit in the image of the hologram is not associated with a specific point on the hologram itself but is instead spread over the total surface. As a result, microscopic imperfections in a film do not degrade specific portions of the image but instead degrade the image as a whole. If the geometrical area of a small film imperfection is $\pi a^2$ it can at worst cause a loss of light of $4\pi a^2$. Thus so long as film imperfections constitute less than one quarter of the total hologram area, the image is preserved.

OBJECTS

The principal object is to provide a holographic storage system having greater volumetric efficiency in storage and lower cost than storage systems of the prior art.

Another object is to provide a low cost mass storage system having data storage densities greatly in excess of those of the prior art systems.

A further object is to provide a high density storage system in which the storage media is insensitive to dust and scratches.

A more detailed object is to provide a data mass storage system wherein the alignment and tolerances of the storage media are not critical.

The foregoing and other objects, features, and advantages of the invention will be apparent from the following more particular description of preferred embodiments of the invention, as illustrated in the accompanying drawings.

IN THE DRAWINGS

Figures 1, 2:
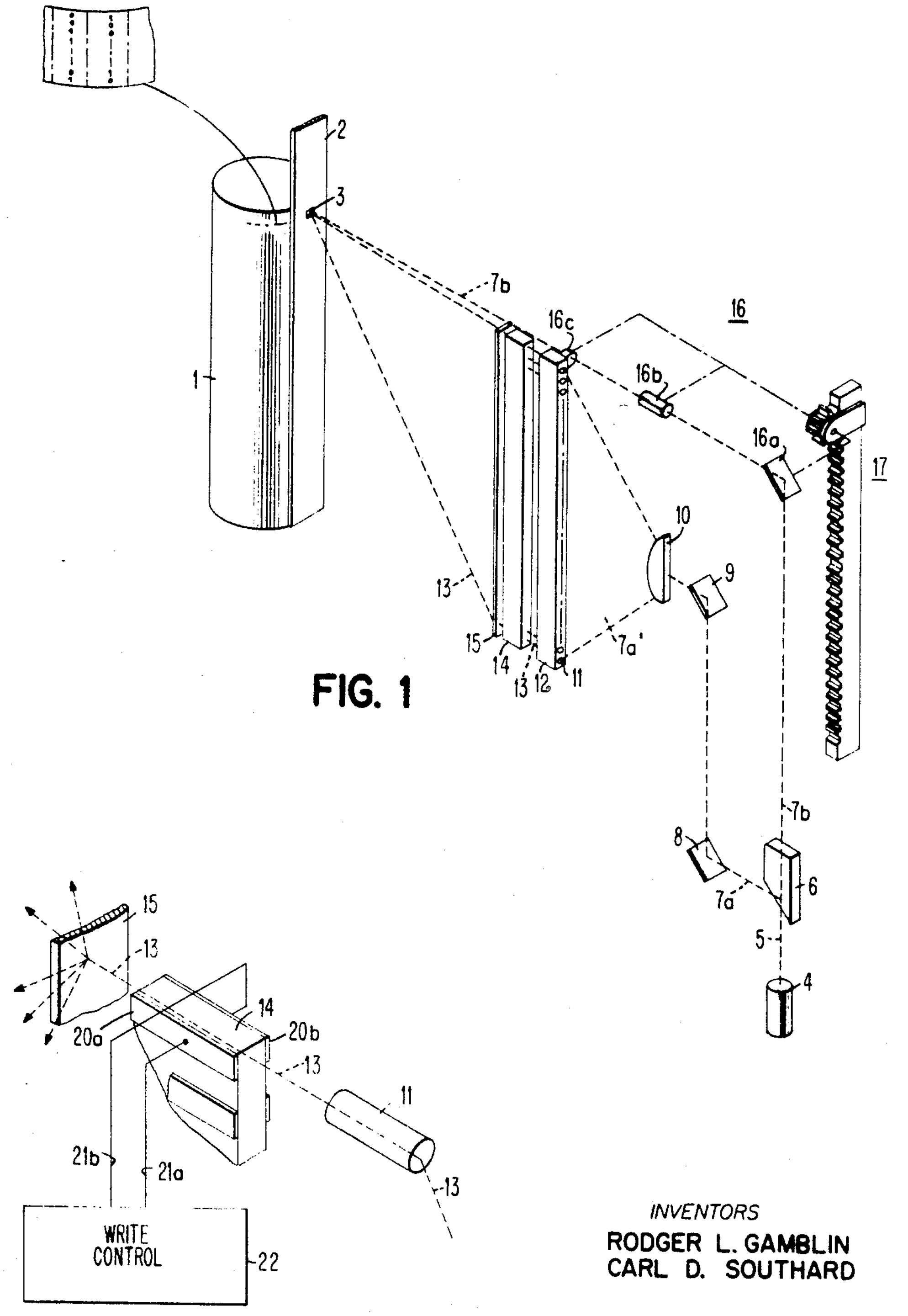
FIG. 1 shows the arrangement for writing hologram patterns of coded data on the photosensitive surface of the storage system drum.
FIG. 2 is a detail for selectively controlling the coded pattern in the information beam.

Referring to FIG. 1 the arrangement for writing (or storing) coded representations of data comprises a drum 1 whose surface is constituted of a photosensitive medium which photographically reacts upon exposure to radiation, for example, light. Selected areas of an individual drum band are exposed by way of a mask 2 having an opening 3 through which light in the form of interference patterns is admitted to impinge upon the photosensitive surface of the drum, different patterns of light representing different patterns of coded information. The interference patterns are produced in accordance with well-known principles of holography by means of the interference produced when an information beam is intermixed with a reference beam, the former being constituted of different patterns of individual component light beams.

The mechanism for generating the reference and information beams comprises a coherent light source 4 which issues a coherent beam 5 that is split into an information beam segment 7*a* and a reference beam segment 7*b* by means of a beam splitter 6. The segment 7*a* is optically directed by way of mirrors 8 and 9 to an expander lens 10 producing a divergent beam 7*a'* that is incident along the total length of an array of individual lenses 11 suitably disposed in a matrix bar 12. The light in passing through the individual lenses 11 provides a plurality of parallel beams 13 that impinge upon an optical switching means 14 which may, for example, be an arrangement of Kerr cells or the like. The individual beams, comprising the information beams 13, emerging from the switching means 14 are passed through a diffuser 15 so that a portion of each beam is directed through the mask opening 3 and onto the photosensitive surface of the drum 1, the different coded patterns of the information beam 13 being developed under control of the switch means 14 in a manner to be subsequently explained. These different information beam patterns are made to interfere with the reference beam segment 7*b* that is directed by way of an optical system 16 comprised of a mirror 16*a* and lenses 16*b* and 16*c*. The optical system is adapted to be selectively positioned in any one of a plurality of vertical positions under control of a pinion and rack arrangement 17. Each vertical position of the optical system 16 corresponds to an appropriate one of a plurality of vertical bands into which the drum surface is subdivided, each such band containing a number of words of information.

By suitable means, not shown, the drum is indexed for rotation along its vertical axis to present a discrete area of the unexposed surface for each coded pattern of information to be recorded thereon. A fragmentary portion of the drum surface is enlarged to show schematically the coded representations for the interference patterns written on the drum surface. The manner of controlling the formation of the different patterns in the information beam 13 is exercised by means of a write control means 22 which is essentially a switching means for selectively applying control voltages to discrete sections of the Kerr cell 14. As seen in FIG. 2 a portion of the Kerr cell is constituted of front and back conductive strips 20*a* and 20*b* to which appropriate voltages are applied by way of lines 21*a*, 21*b* connected to the write control means 22. The absence of a voltage to the Kerr cell enables light to pass therethrough, whereas the presence of a voltage on the cell prevents the passage of light therethrough. Thus the write control means 22 is controlled to provide any desired combination of voltage patterns to the switching means 14 to provide the different information patterns in the information beam 13 that interferes with the reference beam 7*b* to provide the appropriate writing patterns on the surface of the drum. After development of the exposed drum surface, the recording is considered complete and the resulting surface when subjected to the influence of the reference beam in a read out environment causes the read out of the stored patterns of coded information.

Figure 3:
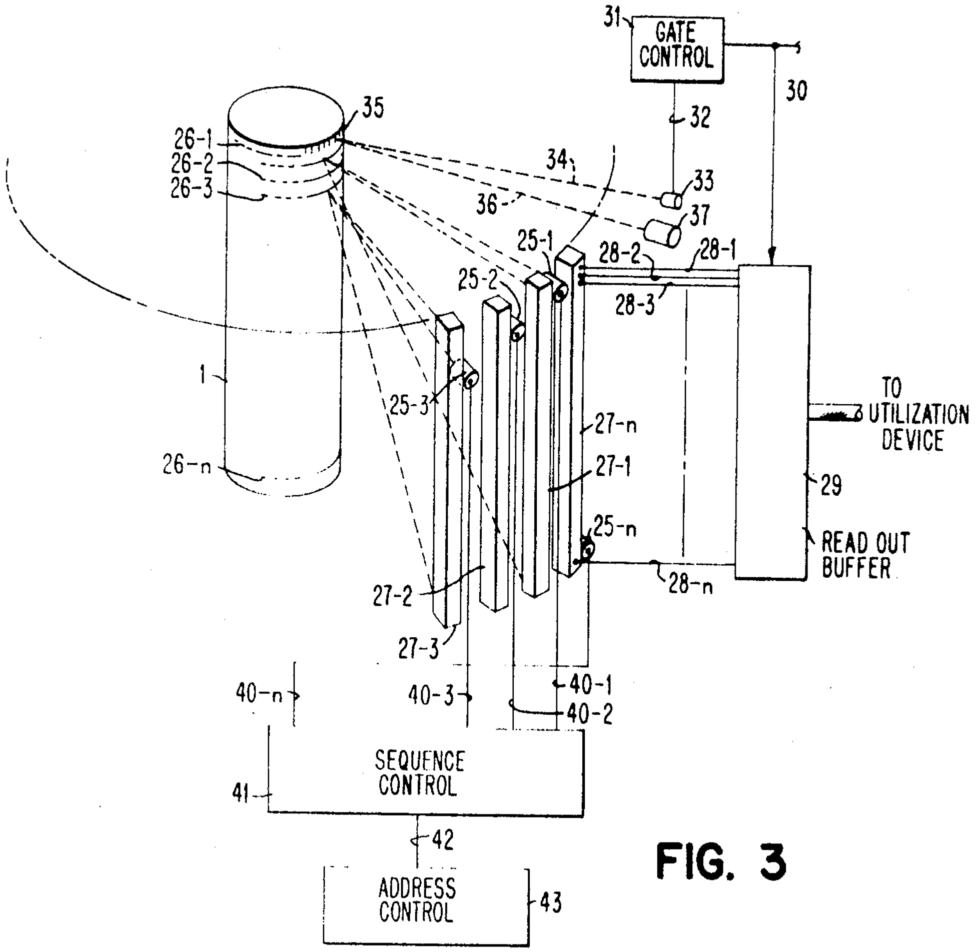
FIG. 3 shows a read out arrangement of radially disposed photodiodes and light sources for reading out the data stored on the drum of the system.

As seen in FIG. 3, the arrangement for reading out the information stored on the drum comprises an array of light sources 25-1, 25-2, 25-3 . . . 25-n radially offset relative to individual bands 26-1, 26-2, 26-3 . . . 26-n into which the drum surface is subdivided. Each light source 25 provides an appropriate light beam directed to an appropriate drum band and by reflection the written patter of information is read out onto an appropriate one of a plurality of radially disposed photodiode matrices 27-1, 27-2, 27-3 . . . 27-n. Each diode matrix contains a plurality of photodiodes, vertically arranged, upon which is incident the pattern of information reflected from an appropriate one of the drum bands 26. Outputs from the various photocells are interconnected to individual read out buffers. To avoid confusion in the drawing, only a single buffer, namely, buffer 29, and a few interconnections thereto are shown, namely 28-1, 28-2, 28-3 . . . 28-n. Electrical patterns of the stored information are read out through these lines 28 and stored in the read out buffer 29 from which the information is read to some form of utilization device under control of a gate control means 31 interconnected by way of line 30 to the buffer 29. The gate control means 31 is interconnected by way of line 32 to a photodiode 33 which receives pulses of reflected light along a path 34 from a drum timing track 35 which has an alternate arrangement of reflecting and non-reflecting surfaces. Light from a source 37 is projected by way of a light path 36 to the timing track 35 from which pulses of light are reflected to the photodiode 33. The latter changes the light pulses to electrical pulses having the characteristics shown in FIG. 4.

Figure 4:
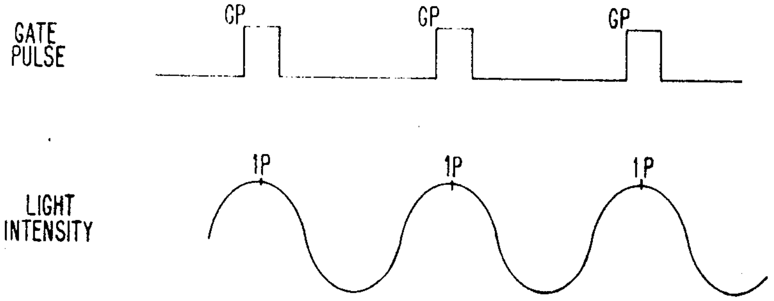
FIG. 4 shows the relationship between gating pulses and light intensity distribution.

On a read out operation the drum is rotated by any suitable means, not shown. During a cycle of rotation, light from the sources 25 are directed to the various drum bands 26 and reflected to the matrices 27. Because of the alternate arrangement between the matrices 27 and the light sources 25 and the manner of their disposition relative to the drum surface an intensity light wave having the characteristics shown in FIG. 4, is realized. An inspection of these characteristics shows that the intensity peaks IP are synchronized with the gate pulses GP. By virtue of this arrangement special timing apparatus normally required in electronic computers is obviated.

Selective read out control is further achieved by connecting the light sources 25 by way of lines 40-1 through 40-n to a sequence control unit 41 in turn connected by way of a line 42 to an address control means 43. Under control of the latter different sequences and combination of light sources can be selected to read out any desired combinations of stored words of information in parallel.

While the invention has been particularly shown and described with reference to preferred embodiments thereof, it will be understood by those skilled in the art that various changes in form and details may be made therein without departing from the spirit and scope of the invention.

What is claimed is:

1. A hologram recording system comprising
   a coherent light source for issuing a coherent light beam;
   optical means for dividing said light beam into reference and information beam segments;
   first and second optical systems disposed respectively in the paths of said reference and information beam segments and adapted to cause said segments to form interference patterns;
   a rotatable drum having a recordable surface which is divided into a plurality of vertical bands upon which said interference patterns are recorded;
   said second optical system further including a columnar array of lenses coextensive with a longitudinal surface portion of said recordable surface, and
   a switching means interposed intermediate said array of lenses and said recordable surface for selectively enabling selected portions of said information beam to interfere with said reference beam segment to provide variations in the interference patterns recorded along longitudinal surfaces of said drum, and means for selectively vertically positioning said first optical system, each vertical position corresponding to one of said plurality of vertical bands.

2. A system as in claim 1 further including a mask disposed in proximity to said drum surface for exposing discrete portions of said longitudinal surface whereby different variations of said interference patterns may be selectively recorded on said drum surface.

* * * * *